United States Patent [19]

Fales

[11] 4,408,202
[45] Oct. 4, 1983

[54] ELECTROKINETIC DISPLAY SYSTEM

[76] Inventor: John D. Fales, 5 Maria Ct., Huntington Station, N.Y. 11746

[21] Appl. No.: 326,554

[22] Filed: Dec. 2, 1981

Related U.S. Application Data

[63] Continuation-in-part of Ser. No. 93,849, Nov. 13, 1979, abandoned.

[51] Int. Cl.$^3$ ............................................. G09G 3/16
[52] U.S. Cl. ................................. 340/785; 350/355; 350/357
[58] Field of Search .................. 340/785, 787, 788; 350/355, 357

[56] References Cited

U.S. PATENT DOCUMENTS

| Re. 28,360 | 3/1975 | Evans et al. | 204/299 R |
|---|---|---|---|
| 2,353,782 | 7/1944 | Neumark | 204/91 |
| 3,207,684 | 9/1965 | Dotts | 204/299 R |
| 3,443,859 | 5/1969 | Rogers | 350/357 |
| 3,648,269 | 3/1972 | Rosenweig et al. | 340/788 X |
| 3,909,116 | 9/1975 | Kohashi | 204/299 R |
| 3,912,368 | 10/1975 | Ponjee et al. | 204/242 X |
| 3,938,131 | 2/1976 | Van Doorn et al. | 340/785 |
| 3,967,265 | 6/1976 | Jacob | 340/787 |
| 4,043,654 | 8/1977 | Silverberg | 204/299 R |
| 4,071,430 | 1/1978 | Liebert | 204/299 R |
| 4,093,534 | 6/1978 | Carter et al. | 350/355 |
| 4,116,535 | 9/1978 | Ponjee et al. | 204/242 X |
| 4,124,458 | 11/1978 | Moeglich | 204/252 X |
| 4,166,676 | 9/1979 | Furuta et al. | 340/785 X |
| 4,187,160 | 2/1980 | Zimmermann | 350/355 X |
| 4,294,519 | 10/1981 | Hashimoto | 340/785 X |

FOREIGN PATENT DOCUMENTS

522192  6/1975  Japan ................................. 350/355

OTHER PUBLICATIONS

Dash & King; "Electrothinning and Electrodeposition of Metals in Magnetic Fields"; J. Electrochem. Soc., vol. 119, No. 1, Jan. 1977, pp. 51-56.
44th Metal Finishing Guidebook Directory for 1976, pp. 218, 268, 379-382.

*Primary Examiner*—David L. Trafton
*Attorney, Agent, or Firm*—Edgar N. Jay

[57] ABSTRACT

An electrokinetic display system in which zones or patterns of different chemical concentrations and gradients associated therewith are displayed in an electrochemical cell. The electrolyte contains reagents which take part in a reversible reaction during electrolysis. The reagents are self-indicating or include an indicator, or can be mixtures of both. Gas evolved at the electrodes is prevented from mixing the electrolyte too vigorously. D.C. current is passed between the cell electrodes in one direction long enough to establish a visible flow in the electrolyte. The use of reagents which take part in redox reactions or in which a reversible change in pH takes place is set forth. In a preferred embodiment, the active species in the electrolyte including the electrolysis reaction products are accelerated by a magnetic field transverse to the electric current path. Arrangements for widely varying the visible or multicolored eddy current patterns generated are set forth including moving the magnetic field, varying the current as by reversing and/or interrupting the current, and using alternating current. Also set forth are arrangements for excluding pH or redox indictors from the region of the electrodes.

70 Claims, 18 Drawing Figures

ELECTROKINETIC DISPLAY SYSTEM

This application is a continuation-in-part of my application Ser. No. 93,849, filed Nov. 13, 1979 and now abandoned.

This invention relates to a method and apparatus for maintaining a chemical concentration gradient and, more particularly, to such systems and apparatus for carrying out the same which can be used for providing moving or substantially stationary multicolored displays in which identifiable or visually distinguishable products of a reversible electrolytic reaction are used to make apparent moving or substantially stationary patterns in the electrolyte.

It has long been recognized that there are chemical reactions accompanied by visualizable effects which in addition to indicating the progress of the reaction, have other uses and esthetic interest. Thus, D. R. Wier in "Light Shows: A Kinetic Art Technique using Chemicals", *Kinetic Art Theory and Practice,* Dover Publications, Inc., N.Y., N.Y. 1974, refers to light shows conducted as early as 1732 and describes a number of reactions involving acids and bases in the presence of pH indicator dyes. The acid-base reagents identified are sulfuric acid and sodium hydroxide, and a number of indicators are tabulated. It is pointed out that indicators in crystal or powdered form were preferred and thymol blue sodium salt and bromthymol blue were mainly used. Wier also points out that motion of the liquids occurs either through mechanical agitation, or by thermal convection induced by the heat from a lamp or by exothermic chemical reactions. Factors which limited the duration of the display were the filling of the reaction receptacle (a large water glass) to overflowing or the occurrence of chemical and hydrodynamic equilibrium.

Oscillatory chemical systems are described by a number of writers. J. Walker writing in *Scientific American,* June 1978, refers to previous work (B. P. Belousov, 1958) involving a mixture of potassium bromate, ceric sulfate and citric acid in dilute sulfuric acid that provided a reaction which oscillated between colorless and yellow. Other systems are referred to which oscillate between red and blue, violet and blue, red and green, and colorless to gold to blue. Systems including reactions in which oxidation-reduction oscillations take place involving the ferric ($Fe^{+3}$) and ferrous ($Fe^{+2}$) forms of Fe are also described, such reactions also lasting for a relatively short time, that is a few hours, and terminating with the solution becoming and remaining one color.

The known prior systems left much to be desired. In particular, the duration of the color displays was too short to be considered anything more than a transient phenomenon; start-up requirements were not only too demanding for an unskilled operator, but also constituted a hazard to the operator because of the nature of the reagents utilized; and the systems were not so designed as to facilitate the display of the patterns generated.

The present invention stems from the discovery that those electrolytic reactions, which are essentially chemically reversible with respect to the initial chemical composition of the electrolyte and the chemical composition of the electrolysis products, are capable of being spatially displayed in such a manner that chemical concentration gradients are maintained. Regions or zones of different chemical composition can be observed as patterns of different colors which are substantially stationary or moving; indicators of pH or other chemical concentration indicators being used when necessary to provide the desired colors. The patterns formed by zones of different color are observed adjacent to and/or in the space between the electrodes and can be used to visualize predetermined indicia or the effects on the initial electrolyte and the electrolysis reaction products of such transport phenomena as diffusion, convection or mixing. It has been found that the reaction products of a chemically reversible reaction such as, for example, the products of a reversible oxidation-reduction (redox) electrolytic reaction persist to form well defined patterns in the electrolyte which change with time and to which more or less rapid motion can be imparted, as desired, while the rate of mixing therebetween can be surprisingly small.

In carrying out a preferred embodiment of the present invention, at least initially, a direct electrical current is passed between spaced electrodes extending in an electrolyte by connecting them across a suitable source of electromotive force. The starting electrolyte contains at least one reagent, that is in addition to water, which during electrolysis forms reaction product species that chemically react reversibly. In the ensuing reactions, electrons enter or are added at the cathode (reduction) and leave or are removed at the anode (oxidation). The electrolyte in any instant will contain two or more differently charged species, for example, positive, negative and/or neutral species. When current flow is interrupted, regeneration of the starting electrolyte proceeds to more or less completion depending upon the duration of the current interruption, agitation of the electrolyte and other factors.

It is important in carrying out the present invention to display moving patterns that the electrodes be located in the reaction cell or chamber far enough apart so that the reaction products formed at one of the electrodes cannot too quickly combine with the reaction products formed at the other electrode and thus rapidly reverse the electrolytic reaction with consequent reformation of the initial electrolyte. While the length of the path between the electrodes in the electrolyte will affect the electrical parameters of the circuit of which it forms a part, as well as thermal gradients in the electrolyte, suitable adjustments can readily be made to accommodate substantial differences in interelectrode distances so long as the electrodes are not brought so close together that the chemical reaction products mix too soon after being formed or are in such a small space as to regenerate the starting electrolyte too quickly. In that event, what would be observed is essentially the starting electrolyte or its color or the observable effects so superimposed upon one another as to serve little or no useful purpose. In practice the spacing between the electrodes can vary widely, as little as 3 or 4 inches being about the minimum useful spacing for moving patterns but at that electrode spacing it is especially desirable that those effects which promote mixing or rapid movement of the reaction products be retarded if the starting electrolyte and the electrolytic reaction products are to be maintained side-by-side. On the other hand, when the generated color patterns are to be substantially stationary then the distance between the electrodes of opposite polarity relative to each other can be much less if desired.

Flows induced by the evolution of gas, if any, from the electrolytic reaction, particularly in relatively small volume devices, can cause undesirably rapid mixing of the starting materials with the electrolytic reaction products. Preferably, the flows induced by such gas as may be evolved are restricted or isolated from the cell chamber in which the electrolyte and the reaction products are desired to remain for a substantial time in side-by-side relation whether stationary or moving.

The electrodes used should be able to withstand the environment created by electrolysis of the selected electrolyte long enough to permit a useful or, better yet, an advantageously long operating life. In such severe electrochemical environments as those produced by sodium sulfate and other active acid-forming electrolytes, platinum and platinum-clad electrodes have been successfully used, the preferred solid platinum wires having demonstrated an indefinitely long useful life. Electrodes having a shorter operating life in such severe environments can be used if desired and this is facilitated by providing electrode mounts and connections which permit quick removal and insertion of the electrodes.

In any given cell it is also advantageous to ensure that the resistance of the current path provided by the electrolyte be low enough to permit the flow of the required amount of current without excessive heating. In addition to the undesired power drain represented by overheating, other undesired effects may result such as loss of water from the electrolyte by vaporization. Thus, when isolation of gas evolved adjacent to the electrodes is accomplished by restricting the cross-sectional area of the device adjacent to the electrodes, current flow should be controlled so as to avoid undesired local heating because of the resulting increase in resistance to current flow at the restriction.

The dimensions of the cell defining the electrolytic reaction chamber can vary widely and will largely depend upon the effects desired or the use for which the system is intended. Thus, in the case of a device for providing interesting esthetic effects, front and back plates 4 in. by 5.5 in. spaced 0.25 in. apart gave good results while better results were attained using 9 in. by 12 in. front and back plates because of the faster rate of mixing in the smaller cell caused by gas evolution. As will be more fully pointed out hereinbelow in another preferred embodiment of the present invention means are provided for controlling the gas evolved to minimize its effect in causing mixing of the electrolytic reaction products. The larger cells require more electrical current in operation but for esthetic display purposes are generally more interesting. Thus, a cell 1.5 ft by 2 ft was readily provided which gave excellent results. It may be noted that in the case of each cell thus far described, the cell was disposed with the shorter dimension of its plates extending substantially vertically although the plates defining the display area of a cell can be disposed in a non-vertical manner, e.g. horizontally, as will be more fully described hereinbelow.

As in the case of the plate dimensions, the spacing between the plates forming the cell can vary. However, the plates should not be positioned so close together that the color density of the reaction products or of indicator dyes, when used, is too low for visualization. The solubility of the dye used should also be taken into account. Another factor to be considered is the viscous drag at the inner surfaces of the plates which may prevent the desired circulation or require excessive circulating factor when the plates are too close together. Because the fluid between the plates functions as an electrical conductor, the thickness of the cell, that is the space between the plates, should not be so small as to objectionably increase the electrical resistance of the cell with a concomitant generation of heat which in turn would cause excessive evaporation. As a rule, the ratio of the distance between the electrodes to the front-to-back distance between the walls or plates extending from an electrode to the others should not be less than 5:1 and preferably not less than 10:1. It has also been found that the cell plates should be more than about ⅛ inch apart to provide useful results and good results are attained with a spacing of about ¼ inch. Much larger cell thicknesses can be used. A cell 11 in. by 14 in. spaced by 1 inch gave good results and had lower electrical resistance than other embodiments in which the plates were ¼ in. and ⅜ in. apart. While an interplate or cell thickness of as much as about three inches can be used and still provide useful results as a disply method or device, a thickness of no more than about one inch is preferred. As the cell thickness is increased above three inches, the loss of definition of the desired visible flow pattern already noticeable at three inches quickly increases to the extent that the desired display is not attained.

In the case of an electrolyte containing ferric and ferrous salts in acid aqueous solution, green-yellow in color, the reaction at the cathode will involve the addition of an electron $(-)$ to the ferric ion $[Fe^{+3}+(-)]$ to form the ferrous ion $(Fe^{+2})$ and a change in color to pale blue. At the same time, at the anode by the removal of an electron, a ferrous ion is oxidized to the ferric state, $[Fe^{+2}-(-)=Fe^{+3}]$ with a color change to yellow. Another redox reaction that is also well known involves the organic compounds quinone and hydroquinone which, in an acid aqueous electrolyte, gives at the cathode:

$$C_6H_4O_2 + 2H^+ + 2(-) = C_6H_4(OH)_2$$

while the reverse reaction occurs at the anode. The quinone-hydroquinone redox system (brown-yellow and colorless respectively) is representative also of those systems which do not require the addition of a redox indicator which changes color with changes in the oxidation state of the system. For those redox systems which do require a redox indicator there are a number of dyes available form which one having the desired potential at which it is half-changed can be selected (see for example plage 981, Lange Handbook of Chemistry, McGraw-Hill, 10th Ed, 1967). There are also a number of pH indicator dyes which exhibit color changes corresponding to changes in the pH of the electrolytic reaction as will be pointed out more fully hereinbelow.

An electrolyte made up of an aqueous solution of sodium sulfate $(Na_2SO_4)$ through which a direct current is passed, is representative of a reversible electrolytic reaction accompanied by changes in pH which are readily visualized by the addition of a small amount of a commercially available wide range pH indicator, for example, pHydrion*. The electrolysis of sodium sulfate results in the reaction $$2Na_2SO_4 + 3H_2O = 2NaHSO_4 + 2NaOH + H_2 + \tfrac{1}{2}O_2$$

On termination of the electrolyzing current and mixing of the reaction products the reaction is reversed:

$$2NaHSO_4 + 2NaOH = 2Na_2SO_4 + 2H_2O$$

The loss of water is insignificant for all practical purposes of the present invention so that the reaction is substantially reversible.

*Trademark of Micro Essential Lab. Inc., Brooklyn, N.Y.

In one embodiment of the process of the present invention as thus far described, the multicolored reaction product zones of a given system move away from the electrodes at which they are formed to areas of the cell where they can be seen side-by-side or reacting to produce the starting reagents indicated by the reappearance of the color indicative thereof. That motion may be the result of such transport phenomena as convection, diffusion or mixing, with the latter being caused by the mechanical effect of such forces as those derived for example from gas evolution at one or more of the electrodes. When the electric current between the cell electrodes is interrupted long enough, the starting electrolyte is more or less rapidly restored depending upon a number of factors including the rate of mixing of the cell contents.

In a more preferred embodiment of the present invention, characterized by its production of much more interesting and changing color patterns, the electrolyte fluid is induced to flow but without such turbulence as would cause objectionable intermixing of the reaction products. The desired flow is streamline flow characterized in that the differently colored reaction products are induced to flow but not in a straight line with the differently colored zones of the reaction products as well as of the starting electrolyte flowing in side-by-side relation as viewed by an observer. The fluid flow is preferably induced by the interaction of the electric current flowing across the cell between the electrodes and a magnetic field substantially perpendicular to both the electric current and the resulting induced fluid flow. A highly advantageous and simple arrangement is that in which a suitable D.C. current flow is provided across the cell and one or more permanent magnets are mounted behind the cell, that is on the side of the cell away from the viewer. The arrangement is such that magnetic fields extend into or through the electrolyte substantially perpendicular to the electric current so that the fluid flow is accelerated vertically upward or down depending upon the direction of the electric current and magnetic fields. The direction of the induced acceleration is readily reversed by reversing the polarity of the electrodes or by changing the direction of the magnetic field. While desirable effects are obtained with one or more manually movable magnets better results are attained by providing motor means for moving the magnet assembly in a plane substantially parallel to the face of the cell. The movement of the magnet assembly can be continuous, at constant or variable speed or intermittent as desired. As will be more fully described hereinbelow, the present invention lends itself to wide variations not only in the manner in which the fluid patterns are generated but also in the rate at which they are changed. Outstanding results are obtained when the magnitude and direction of the electric current as well as the position of the magnets are varied. This may include interrupting the electric current flow and thereby turning off the force resulting from interaction with the magnetic field so that the fluid, except for thermal or density gradients, is substantially free of applied forces. Under those conditions many hours may be required for the undisturbed cell to reach chemical equilibrium and during that time convection currents caused by changes in ambient temperature may continue to cause changes in the visible color patterns.

The precise mechanism by which the magnetic field and the current-conducting electrolyte interact is not fully understood but it is believed to be related to or similar to the mechanism which drives the armature of a direct current motor or the mechanism which gives rise to the well known Hall effect. The Hall effect is defined* as "when a steady current is flowing in a steady magnetic field, electromotive forces are developed which are at right angles both to the magnetic force and to the current and are proportional to the product of the intensity of the current, the magnetic force and the sine of the angle between the directions of these quantities". When the current flow in the cell is perpendicular to the magnetic field with both being directed horizontally, then the induced electromotive force is given by $f = BIl$ when B is the intensity of the magnetic field, I is the current and l is the length of the current path in the stream affected by the magnetic field; then the direction of the force will be upward or downward relative to the horizontal depending upon the directions of the current and magnetic field. In an embodiment of the present invention in which both the cell current and the magnetic field are substantially horizontal, if the force F is directed upward and if most of the current is carried by positive ions, an excess of positive ions would be expected to be driven towards the top of the cell. Consequently, the Hall emf, measured with respect to the bottom of the cell, would be positive. On the other hand, if most of the current is carried by negative ions, the Hall emf, measured with respect to the bottom of the cell would be negative because an excess of negative ions is driven toward the top of the cell. If the current is carried equally by both positive and negative ions, the Hall emf would be zero. In all three cases, the force, F, on the electrolyte is the same as is consistent with observations made during the operation of the present invention.

*Handbook of Chemistry and Physics, CRC Press, 57th Ed. page F-106.

Further objects and advantages of the present invention will be apparent from the following more detailed description of preferred embodiments of the present invention and the accompanying drawings in which.

Figure 1:
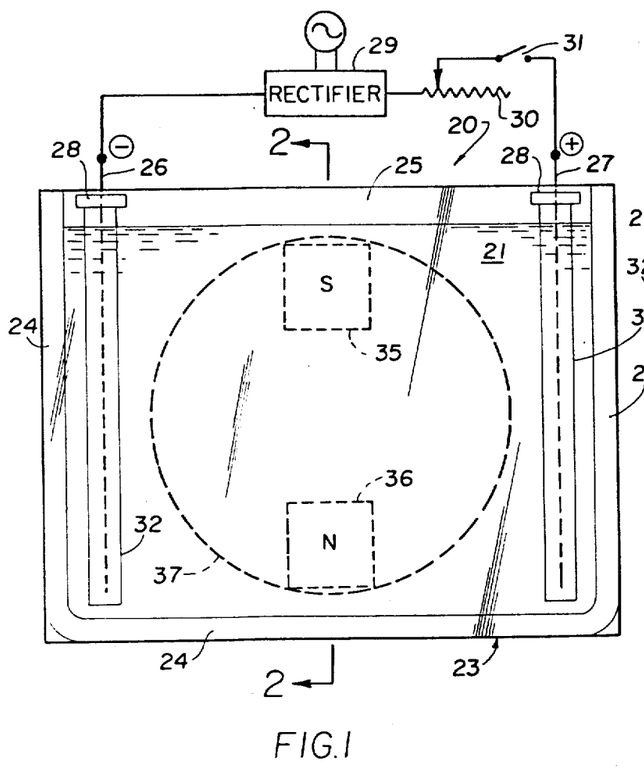
FIG. 1 is a front elevational view of an electrokinetic display device constructed in accordance with the present invention.
Figure 2:
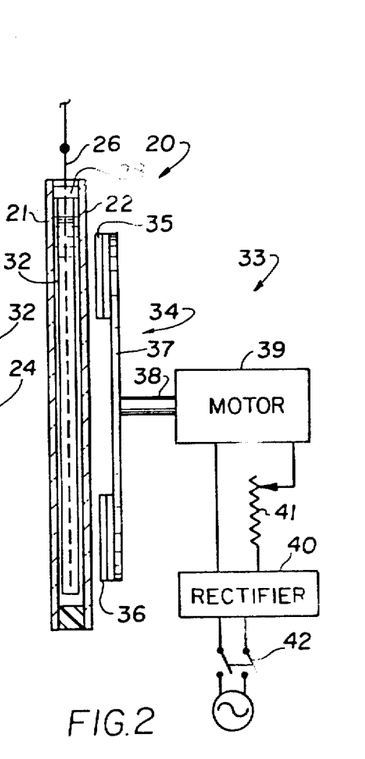
FIG. 2 is a cross sectional view through the line 2—2 of FIG. 1 in the direction indicated.
Figure 3:
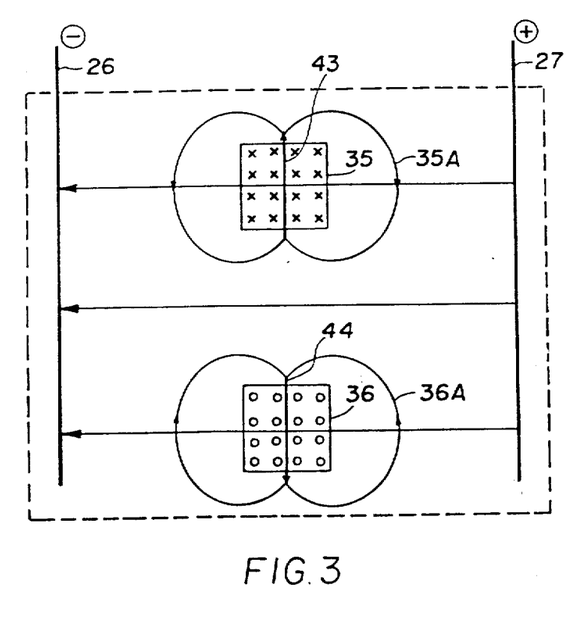
FIG. 3 is a diagrammatic view of the device shown in FIG. 1.

Referring now to FIGS. 1-3, a preferred embodiment of an electrokinetic display device 20 comprises two substantially parallel plates 21 and 22 spaced about ¼ inch apart and joined by suitable sealing means 23 adjacent to their peripheries except at the top (as viewed in FIGS. 1 and 2). A preferably transparent plate 21 forms the front and plate 22 the back of device 20. Plates 21 and 22 can be glass or plastic such as an acrylic resin as shown in FIG. 1 and, instead of being discrete, can be integrally joined along one or more edges. The top of the device 20 may be substantially entirely open as shown in FIG. 1 or substantially closed while leaving it possible for any gas evolved to leave the electrolyte.

Sealing means 23 in the case of the plastic plates 21, 22 shown, comprises plastic strip 24 of the desired width cemented in liquid-tight relation between the juxtaposed plates 21 and 22 at their peripheries along the sides and bottom thereof by a solvent cement (not shown) to form cell chamber 25 between the plates.

A pair of electrodes 26, 27, preferably made of platinum wire are mounted adjacent to the left and right extremities (as viewed in FIG. 1) of cell chamber 25. Any suitable support means can be used to position the electrodes and as shown may include spacers 28 which also serve to support porous tubes 32, one for each of the electrodes 26 and 27, which enclose the electrodes and extend above the electrolyte level of the cell to communicate with the atmosphere or a suitable collector (not shown). The tubes 32 are porous with respect to the electrolyte and the soluble reaction products but serve to confine the gases evolved so as to minimize agitation of the electrolyte thereby outside of tubes 32. If desired, the portions of tubes 32 extending above the surface of the electrolyte can be readily made non-porous as by a suitable coating.

Cell chamber 25 is filled with a desired electrolyte, as for example about a 0.5 N aqueous solution of sodium sulfate (about 35.5 grams $Na_2SO_4$ per liter of aqueous solution). The electrodes 26 and 27 are connected across a source of direct current as indicated by full wave rectifier 29 through a manually variable resistor 30 and on-off switch 31. The apparatus as thus far described can be operated in accordance with one aspect of the present invention. For convenience, the starting pH of the solution is preferably adjusted to about 7 by adding $H_2SO_4$ or NaOH as required. To facilitate observation of the movement of the streams generated during electrolysis, about 0.067 grams of phenolphthalein and about 0.013 grams of bromcresol green per liter of sodium sulfate solution were added to the electrolyte which together given a yellow color at low (acid) pH, greenish-yellow at neutral (7) pH, blue at mildly alkaline ($>7$-8) pH and purple at strongly alkaline ($>8$-10) pH.

Figure 1A:
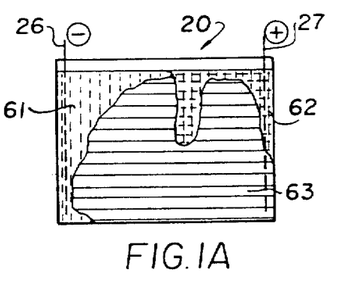
FIGS. 1A and 1B are diagrammatic views showing color patterns generated in the apparatus of FIG. 1 during earlier and later stages of operation.
Figure 1B:
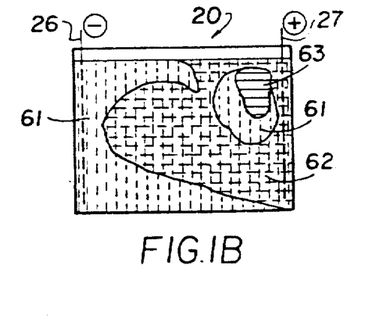

With switch 31 closed, resistor 30 is adjusted to provide the desired current flow, e.g. about 0.2-0.4 amperes, through the cell. Colored streams of fluid slowly rise close to the electrodes, purple 61, near electrode 26, yellow 62 near electrode 27 and a downward yellow flow 62 occurs near the center of cell 20 with colors after about 5 minutes as indicated in FIG. 1A. Because the electrolyte in cell chamber 25 was free of particulate matter, the flows generated in the electrolyte were visualized only because of the difference in colors of the flows or streams. While a relatively large area of blue 63 representing mild alkalinity is evident during the early period of operation, once a steady state is reached after about 30 minutes, there is only a relatively small area of blue representative of a mild alkaline pH as shown in FIG. 1B. When it is desired to increase the area of blue-green color characteristic of mid-range pH values during substantially steady state operation, a small amount of a pH buffer salt which tends to maintain neutral pH ranges is added to the starting electrolyte. For example, the addition of disodium phosphate buffer salt to the 0.5 N sodium sulfate to provide 0.066% by weight of disodium phosphate buffer salt, during steady state operation, increases the area occupied by the blue-green from a trace to about 40%; the purple area is also significantly increased and the yellow area is significantly reduced. By means of a sutable choice of buffer salts, the area of color representative of any desired pH value for the electrolyte may be augmented. It is to be understood that the patterns shown in FIGS. 1A and 1B are by no means static but continue to change though at a relatively slow rate.

During operation, the gases evolved, hydrogen at the cathode and oxygen at the anode, are confined by the tubes 32 surrounding the electrodes and thereby isolated from the remainder of the cell; the gas being released by flowing upwardly in the respective tubes 32. When the unit is operated with tubes 32 removed the gas evolved tends to cause relatively rapid flow of the colored streams, much more rapid than when the tubes 32 are in place as is preferred.

After prolonged operation of the cell 20 with the tubes 32 in place and without the motive means 33 yet to be described, the basic, purple fluid tends to accumulate in the lower and left hand part of the chamber 25 and the acidic, yellow fluid tends to accumulate in the upper part of the chamber 25 perhaps because of differences in density between low pH and high pH regions of the electrolyte. Therefore, as is more preferred, motive means 33 are provided for accelerating the fluid streams without creating such turbulence as would cause excessive mixing of the acidic and basic flows and consequent neutralization at a rate faster than the rate at which they are generated by electrolysis. Preferably, motive means 33 for accelerating the fluid flows comprises magnetic means 34 in the form of two permanent magnets 35, 36 mounted about 180 degrees apart on a disc 37 rotatably supported behind the cell 20. Disc 37 is made of ferromagnetic material such as ferromagnetic steel as shown. When disc 37 is positioned in the line of sight of an observer viewing from in front of cell 20 then the back plate 22 should be rendered opaque as by painting its outer surface with a suitable paint. As indicated in FIGS. 1 and 3, magnet 35 is mounted with its south pole facing the cell chamber 25 and magnet 36 is mounted with its north pole facing the cell chamber. Thus, as shown in FIG. 3, a magnetic field is directed into the paper at magnet 35 and out of the paper at magnet 36.

As shown, disc 37 is mounted on the output shaft 38 of motor 39. Motor 39 is preferably a low speed motor, a 1 RPM, 4 volt D.C. motor having given good results, and is connected in series with resistor 41 across full wave rectifier 40 which in turn is connected across the A.C. power supply through an on-off switch 42. The resistance of variable resistor 41 is preferably selected large enough so that when completely included in series between motor 39 and rectifier 40 and with about 4 volts applied to the input of the rectifier 40, the output shaft 38 of the motor 39 remains at rest. By adjusting resistor 41 the shaft 38 has a continuously adjustable speed ranging from zero to about 1 RPM. Further control can be readily provided by means of step-down pulleys (not shown) or the like.

Now when the electrokinetic cell 20 is energized by closing switches 31 and 42 with resistor 41 at any position other than its extreme off position, with electrode 27 connected to the positive and electrode 26 to the negative side of their power supply as indicated, a current flow from right to left is induced in the electrolyte in cell chamber 25. Interaction between the electric current and the magnetic field results in electromagnetic forces as indicated in FIG. 3 by arrows 43 and 44, whose direction is not affected by the rotation of the magnets 35 and 36 on disc 37 about shaft 38. Thus the charge carriers, consisting of various positively and negatively charged species of the initial electrolyte, together with those produced by the electrolytic reaction, interact with the magnetic fields so as to be accelerated in the directions of the arrows 43 and 44. In turn, the motion of the charged species is transferred to the cell fluid. The resulting fluid motion in the vicinity of the magnet poles takes the form of the double eddies indicated by the curved arrows, 35A and 36A (FIG. 3). When the magnet disc 37 is revolving slowly, these eddies revolve with the magnets causing secondary complex eddy patterns in substantially the entire fluid of the cell.

Because during operation of the embodiment now being described the cell fluid is generally divided into regions of fairly coherent pH, and these regions have different colors due to the presence of the pH indicators, the result of the complex eddy motion of the fluid is a complex moving pattern of variously colored eddies. When the magnet disc is stationary, any one of a great number of fixed patterns of swirling eddies, which change in color, is produced depending upon the location of the magnets while at rest. These effects continue while the magnitude and direction of the current flow are maintained. In the event the direction of current flow is reversed or the direction of the magnetic field is reversed then the force acting on the electrolyte is also reversed. However, if both the electric current and the magnetic field are reversed, the direction of forces 43 and 44 are not affected.

Most interesting and desirable effects are obtained when the magnitude and direction of the electric current are changed combined with changes in the position of the magnetic motive means. These effects are further augmented by turning off the electric current from time-to-timed which also eliminates the electromagnetic forces 43 and 44. With the current off, such effects as differences in fluid density and thermal gradients delay and even may prevent the flows from coming to complete rest and slow changes in the visible color patterns persist for extended periods.

Figures 4, 5, 6A, 6B, 6C:
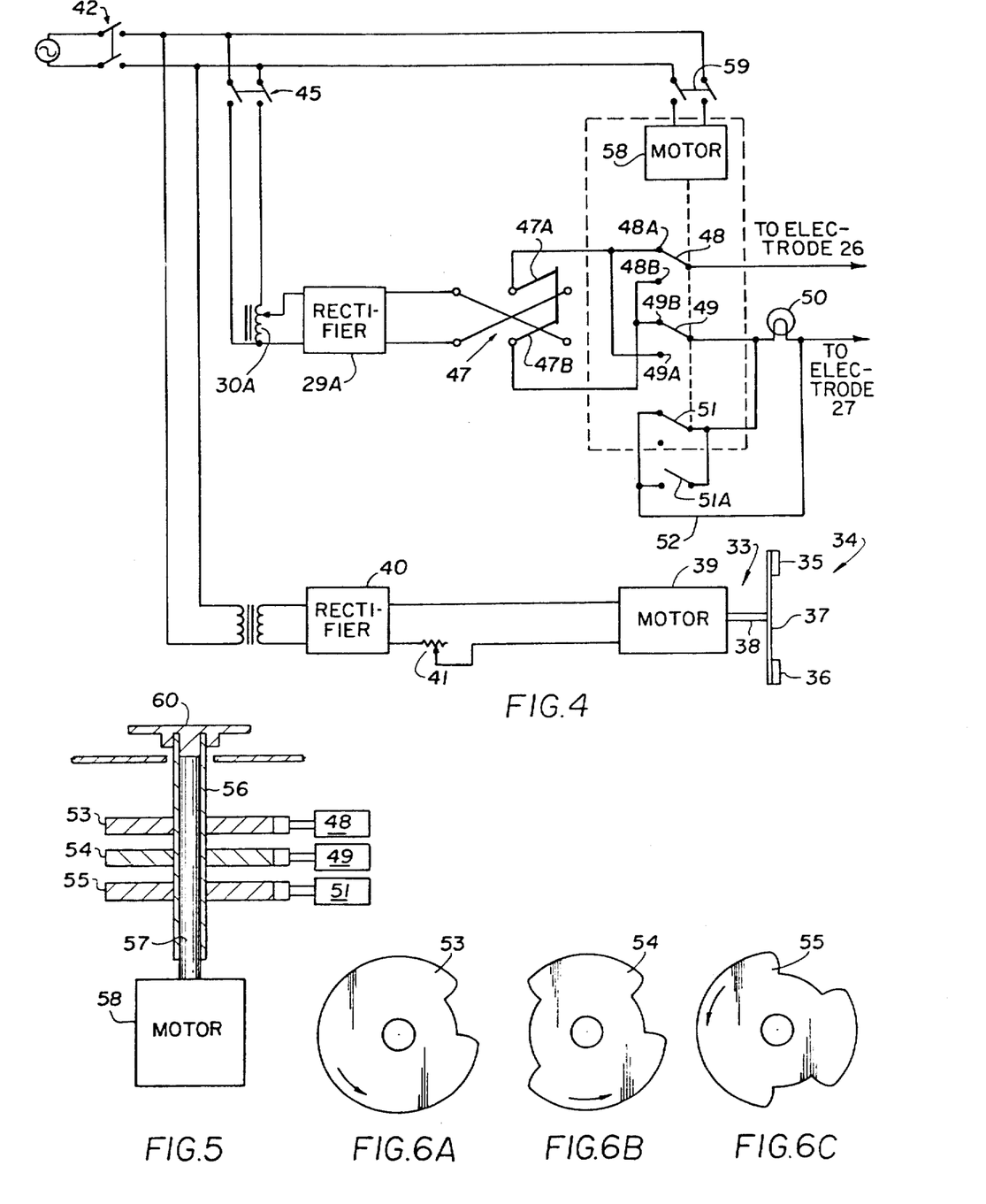
FIG. 4 is a schematic diagram for manual or automatic control of the display device shown in FIG. 1.
FIG. 5 is a diagrammatic view showing the motor drive and associated timing cams for operating microswitches of FIG. 4.
FIGS. 6A, 6B and 6C are elevational views of three timing cams.

Referring now to FIGS. 4, 5, and 6, in a preferred system for operating and controlling the electrokinetic display device 20, full wave rectifier 29A is connected to the secondary of a variable voltage transformer 30A, such as a conventional 0.8 ampere variable transformer, the primary of which is connected across the A.C. power supply through on-off switches 45 and 42. The D.C. output from rectifier 29A is connected through a manually operated double pole, double throw reversing switch 47 to the contacts of single pole, double throw microswitches 48 and 49, the poles of which are preferably cam-actuated. More specifically, pole 47A of reversing switch 47 is connected to contacts 48A and 49A of the switches 48 and 49 and the pole 47B of the manual reversing switch 47 is connected to contacts 48B and 49B of the microswitches 48 and 49. The poles of microswitches 48 and 49 are connected respectively to electrodes 26 and 27. The arrangement is such that microswitches 48, 49 function as both a reversing switch and as an on-off switch. When both are up or both are down as viewed in FIG. 4, the circuit is closed and the current flows in one direction or the other depending on the polarity applied to electrodes 26 and 27. The circuit is opened when one of the switches 48, 49 is on its upper contact and the other is on its lower contact. A suitable resistor such as lamp 50 in series between the pole of microswitch 49 and electrode 27 functions to drop the voltage applied between electrodes 26 and 27 and thus reduces the current flow through the electrolyte in cell chamber 25. A shunt 52 is provided around lamp 50 when microswitch 51, which is also preferably cam operated, is in its closed (raised) position. A manually operable switch 51A is connected in parallel with switch 51 to provide manual operation of the shunt circuit 52 when switch 51 is open. Microswitches 48, 49 and 51, as shown, are controlled by the action of motor driven cams 53, 54 and 55 (FIGS. 5, 6A, 6B and 6C) as will now be described. Cams 53, 54 and 55 are associated respectively with microswitches 48, 49 and 51 and are mounted on tubular member or sleeve 56 which is frictionally fitted over shaft 57 of a low speed motor 58. Sleeve 56 can be rotated at widely varying speeds, 1/15 revolutions per minute gave good results. As shown, cams 53–55 are fixed to sleeve 56 but if desired they can be adjustably and or removably mounted thereon. Also, different sets of cams mounted on sleeves corresponding to sleeve 56 can be provided which can be substituted at will for sleeve 56. Motor 58 is connected across the A.C. power supply through manual on-off switch 59. With switch 59 closed, motor 58 is energized and rotates cams 53–55 which, in turn, control the microswitches 48, 49 and 51 in accordance with whether the shorter or longer radius dwell of the associated cam engages its plunger. Program setting know 60 is mounted at the end of sleeve 56 and can be rotated to set the program manually by rotating cams 53–55 to any desired position whether motor is energized or deenergized.

Figure 7:
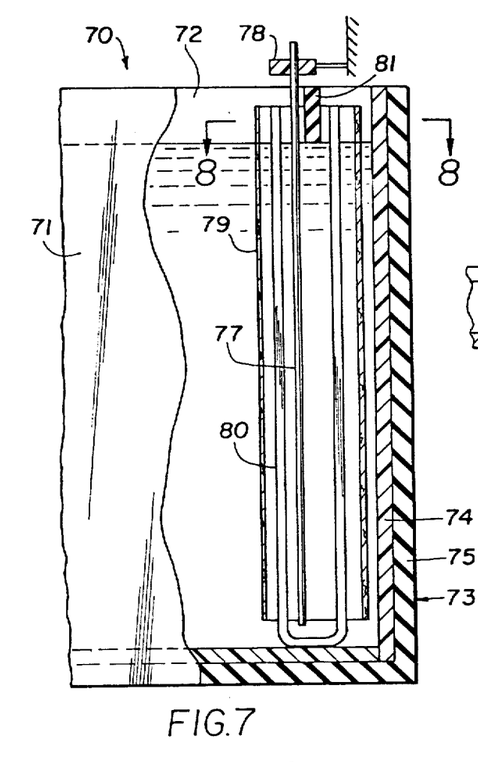
FIG. 7 is a fragmentary front elevational view partially broken away showing a modifed electrode structure.
Figure 8:
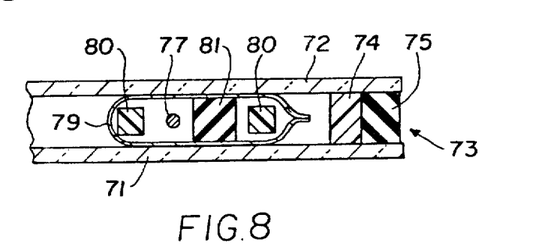
FIG. 8 is a sectional view taken along the line 8—8 of FIG. 7 in the direction indicated.

Referring now to FIGS. 7 and 8, a preferred cell and electrode structure is shown in which electrokinetic device 70 comprises a pair of glass plates 71, 72 joined along their sides and bottom (as viewed in FIG. 7) by sealing means 73 comprising a plastic strip 74 cemented in place between the plates 71, 72 close to but spaced inwardly far enough from the periphery thereof to permit a silicone rubber sealant 75 to be inserted between the edge portions of plates 71, 72 to provide a liquid-tight seal. The electrodes, one of which, electrode 77, is shown in FIGS. 7 and 8, are insulatively supported in any convenient way as indicated by insulator 78 and extends into the cell chamber adjacent to its bottom. Each of the cell electrodes extends within an enclosure 79, in this instance formed of filter paper, mounted on a U-shaped frame 80 formed from a clear plastic. The electrode enclosure assembly extends above the surface of the electrolyte and is held in place by means of a short tapered plug 81 formed of a material such as silicone rubber essentially inert to the electrolyte and the reaction products formed therein. The operation of electrokinetic device 70 with the electrodes connected as described in connection with FIG. 4 will be evident from the description of the operation of device 20 and thus need not be described in detail here except to note that the electrode and its enclosure 79 operate with a minimum of mixing of the reaction products in the electrolyte as a result of gaseous agitation, the gases evolved at each electrode being led by tne enclosure 79 substantially directly upwards to the atmosphere along the electrode. Furthermore, the enclosures 79 added only negligibly, if at all, to the resistance between the electrodes so that little or no heat and consequent evaporation of water from the electrolyte results from the presence of the enclosures 79.

Figure 9:
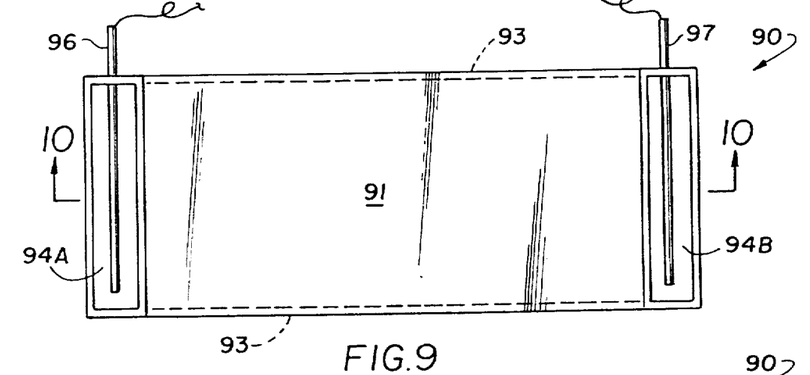
FIG. 9 is a top plan view of another embodiment of an electrokinetic display device in accordance with this invention in which the display area or surface extends horizontally and shown with the magnet assembly omitted for convenience.
Figure 10:
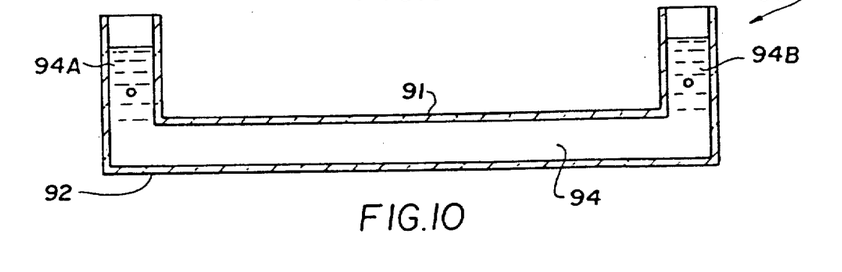
FIG. 10 is a sectional view along the line 10—10 of FIG. 6 in the direction indicated.

Another embodiment of an electrokinetic device constructed in accordance with the invention is shown in FIGS. 9 and 10 where device 90 comprises a pair of horizontally extending opposed upper and lower plates 91, 92 formed of a clear acrylic resin inert to the electrolyte and reaction products formed therein. The plates 91 and 92 are somewhat U-shaped as seen in FIG. 10 and are joined together in liquid-tight relation by strips of the same material cemented thereto. Plates 91, 92 with strip 93 form a cell chamber 94, the vertically extending end portions 94A and 94B of which open upwardly to the atmosphere. Electrodes 96 and 97 extend horizontally into cell chamber end portions 94A and 94B respectively. The wire electrodes are sufficiently rigid to be self-supporting and are cemented in place where they pass through the strip 93 by which they are supported. The electrodes can be connected as described in connection with FIG. 4 and motive means including magnets are preferably provided as described in connection with FIGS. 1-6, either above plate 91 or below plate 92. In operation, gas evolved at the electrodes rises in the end portions 94A and 94B and is thereby prevented from agitating the electrolyte in horizontally extending cell chamber 94. The display provided by device 90 is adapted to be disposed horizontally when viewed. In other respects, operation of device 90 is substantially the same as was described hereinabove in connection with FIGS. 1–6.

As thus far described, the visual effects presented by the colored fluid streams in the electrolyte of the electrokinetic devices 20, 70 and 90 have been intended to be observed by a viewer by means of reflected light. The color patterns can also be observed by means of transmitted light, that is light from a light source located with respect to the device and the viewer so that the light travels through the cell chamber to reach the viewer. Thus, in the case of devices 20 and 70 the light source can be located behind the display device and in the case of device 90 the light source can be located below the display device. In arrangements utilizing transmitted light in which magnet means 34 are also used, the magnets are located to one side of the direct light path from the source to the viewer. For example, the movably mounted magnets can be positioned adjacent the ends of the device near the electrodes and can be further hidden from the observer by providing a light-opaque but magnetically transparent screen.

When it is desired to produce compound colors and compatible indicators or dyes are not available which would permit their use in the same pH zone in a cell, then comparable effects can be obtained by using different indicators in two or more devices which are positioned so as to be optically in series with respect to the viewer. In such an arrangment, for example, methyl red can be used in one device and thymolphthalein in a second device positioned so that light from a light source must pass through both cell chambers in series to reach the observer. Methyl red provides a red color to a low pH zone while thymolphthalein gives a blue color to a high pH zone. When the low pH zone of the first cell is optically aligned with the high pH zone of the second cell with respect to the observer, the color observed is purple. The desired registration of zones of high and low pH is facilitated by controlling the currents in the aligned cells. For example, with certain indicators it may be desirable to align the cells with the positive and negative electrodes of one aligned respectively with the negative and positive electrodes of the other so as to provide for the observation of compound colors.

Figure 11:
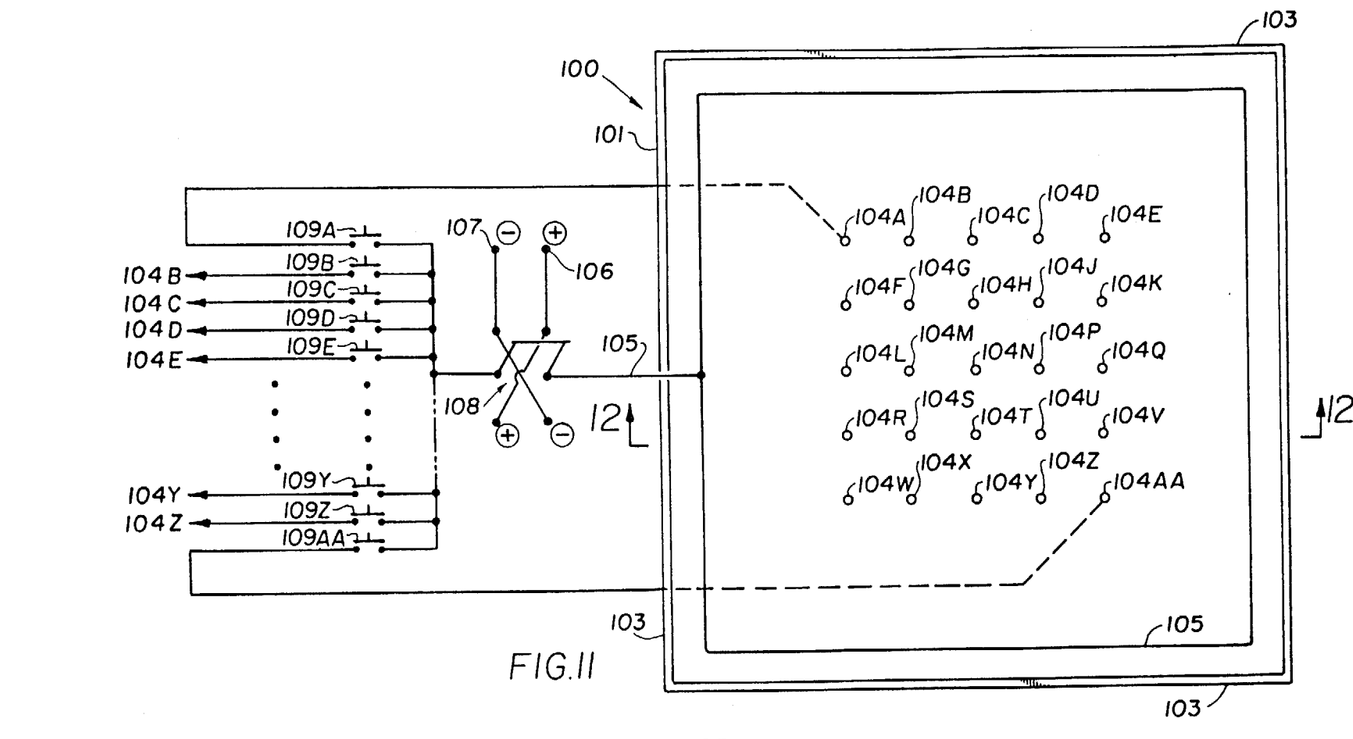
FIG. 11 is a plan view of another embodiment of the present invention adapted for displaying substantially stationary patterns.
Figure 12:
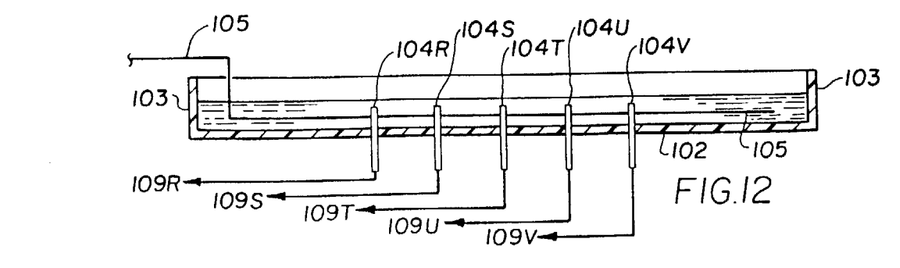
FIG. 12 is a sectional view through the line 12—12 of FIG. 11 in the direction indicated.

Another embodiment of this invention now to be described in connection with FIGS. 11 and 12 is suitable for displaying a predetermined substantially stationary pattern which can have a wide variety of forms. As shown in FIGS. 11 and 12 display device 100 comprises a shallow generally dish-shaped container 101 formed of polyethylene or other suitable material inert to the electrolyte. Container 101 has a substantially horizontally extending base 102 and four upstanding side walls 103. A plurality of electrodes 104, for example 25 as shown, designated 104 A–AA (the letters "I" and "O" having been omitted to avoid confusion), are sealed in mutually insulated relation through base 102 to provide a desired matrix. A common counter electrode 105 is mounted in container 101 around its periphery. Electrode 105 is connected to one pole of reversing switch 108, the contacts of which are connected to terminals 106 and 107 of a suitable D.C. power supply. The electrodes 104 A–AA are connected in parallel to each other through switches 199 A-AA to the other pole of reversing switch 108. As shown, electrodes 104 A-AA are selectively connected to terminal 107 by closing the appropriate switches 109 A-AA. For example, by closing the circuit for electrodes 104 A-E, 104K, 104 L-Q, 104R and 104 W-AA, electrodes for displaying the number "2" will be energized. Container 101 was charged with an electrolyte which was an aqueous solution of trisodium phosphate to which phenolphthalein was added as an indicator and which was partially neutralized with phosphoric acid to a faint pink color. With reversing switch 108 positioned to connect electrodes 104 to the negative side and electrode 104 to the positive side of the power supply, a 5-second current pulse of about 0.1 ampere resulted in the formation of an array of red dots which formed the number "2", red being the color of alkaline phenolphthalein. Reversing the current by shifting switch 108 serves to erase the display and to restore the starting electrolyte. In the display device 100, a plurality of electrodes can be used instead of the common electrode 105 and in that event the individual electrodes are each positioned adjacent to one of the electrodes 104 A–AA and are connected in parallel to one pole of double pole, double throw reversing switch 108, erasing being by mixing the electrolyte.

When it is desired to provide an unchanging display, then a single electrode shaped to provide the desired display can be substituted for electrodes 104 A–AA. Here again, counter electrode 105 can extend around the inner periphery of the device 100 but better results are obtained when electrode 105 is shaped to conform in spaced relation to the other electrode.

As thus far described, the electokinetic display devices have been energized by connecting the cell electrodes across a direct current source. The magnetic field when present is shown and described as being provided by permanent magnets. Electromagnets energized by the direct current source can readily be used instead of permanent magnets thereby permitting reversal of the magnetic field by reversing the connections across the source. When desired alternating current can be used for sustaining operation of the electrokinetic color cells of the present invention once desired chemical concentration gradients have been established in the cell. Thus, an electrokinetic device 110 is shown diagrammatically in FIG. 13 constructed similarly to device 20 as shown in FIGS. 1 and 2 except that instead of permanent magnets 35 and 36 electromagnets 111 and 112 are mounted on disc 37 for rotation, the electrical connections thereto being made by suitable brushes (not shown) or other sliding contacts. Electrodes 113 and 114 are connected across the poles of a double throw, double pole reversing switch 120, the diagonal contacts of which are connected together as connected together and to one pole of double pole, double throw switch 115 the remaining pole of which is connected in series with the windings of electromagnets 111 and 112 to the second pair of interconnected diagonal contacts of switch 120. The contacts of one side of switch 115 are connected across a DC power supply 116 which can be a battery or a source of rectified A.C. The contacts on the other side of switch 115 are connected across AC power supply 117.

Figure 13:
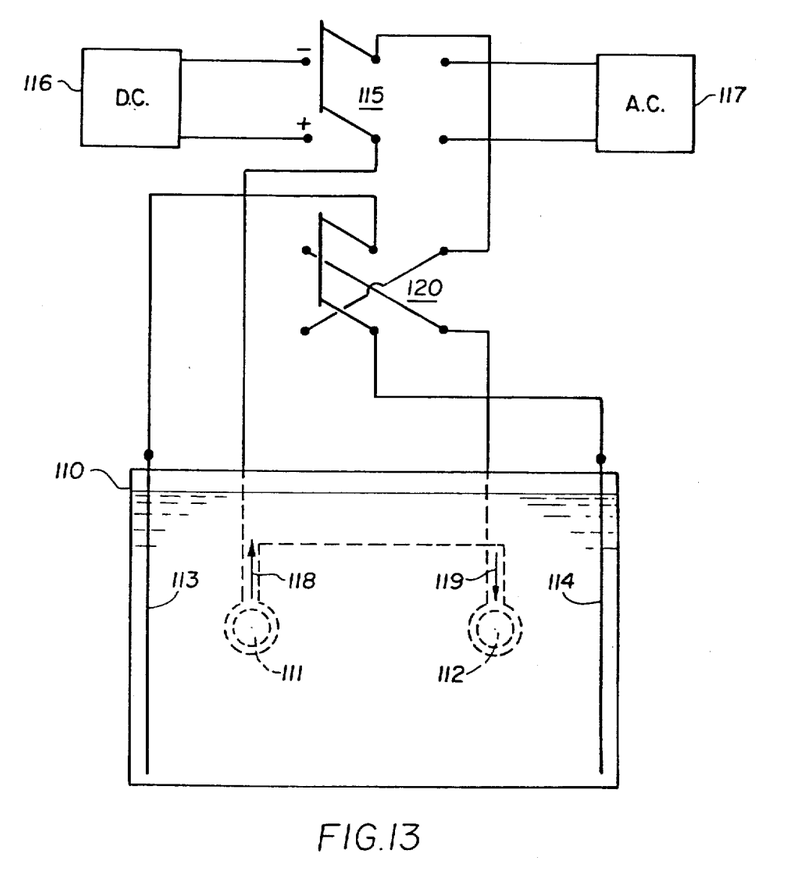
FIG. 13 is a diagrammatic view showing the connection of the cell electrodes and electromagnets across a source of A.C. electromotive force for sustaining operation of the cell.

Operation of device 110 is initiated by filling it with the desired electrolyte and pH indicator if one is wanted and then closing switch 115 on its D.C. contacts. Switch 120 is closed on its right or left contacts (FIG. 13), depending upon which of the electrodes 113, 114 it is desired to have operate as the anode or cathode of the cell. The operation of disc 37 carrying electromagnets 111 and 112 is the same as was described in connection with FIGS. 1 and 2 and need not be repeated here. When the desired pH gradients have been established, switch 115 is shifted to open its D.C. contacts and to close its A.C. contacts. During D.C. operation with switch 120 thrown to the left, the direction of current flow as shown in FIG. 13 is from one pole of switch 115 through the windings of electromagnets 111 and 112 through one side of switch 120 to electrode 113, through the electrolyte to electrode 114, then through the other side of switch 120 back through the other pole of switch 115 to the negative side of the D.C. source. The interaction between the magnetic field and the electric current results in forces on the electrolyte in the direction of arrows 118 and 119. To initiate A.C. operation, switch 115 is thrown to right. During one half of each cycle the direction of current flow and operation is as was just described. During the other half cycle when the direction of the electric current is reversed from that described, the direction of the generated forces as indicated by arrows 118, 119 remains unchanged because the current in the electromagnets 111 and 112 is reversed in step with the reversal of the current in the electrolyte.

When it is desired to change the direction of the forces on the electrolyte, switch 120 is thrown from the position shown in FIG. 13 to its opposite position to reverse the connections to the electrodes 113 and 114 and thereby reverse the current in the electrolyte. With switch 120 thrown to the right, the current direction through the magnet coils during a given half-cycle remains unchanged, but the current through the electrolyte is reversed during the same half-cycle. The reversed cell current results in a reversal of the forces on the fluid and this reversal continues with subsequent alternations of the A.C. supply. If desired, a second reversing switch can be interposed between the input terminal of electromagnet 111 and the output terminal of electromagnet 112 and their respective connections to one pole of switch 115 and the associated pair of contacts of switch 120, to reverse the direction of current flow through the electromagnets 111, 112 without disturbing the direction of flow through the electrolyte.

Because no appreciable electrolysis occurs during A.C. operation, there is no replenishment of electrolytic products giving rise to chemical concentration gradients and ultimately the cell contents are restored to the pH of the initial electrolyte under the mixing action of the eddy flows produced by the electromagnetic forces. Consequently the cell color becomes uniform, the color being that representing the pH of the initial electrolyte, and the visible patterns disappear. Thus, A.C. operation is a means for erasing D.C. established patterns, the speed of erasure depending upon the magnitude of the A.C. current. D.C. operation is again initiated at any time it is desired to restore or increase the contrasting colors.

As was just seen, A.C. operation provides a convenient method for erasing patterns formed during D.C. operation. A most effective way of restoring the equilibrium of the electrokinetic cell of the present invention, particularly those which incorporate magnetic motive means having permanent magnets is to apply an alternating current of low enough frequency that the magnetic force on the fluid has sufficient time to develop the required fluid momentum in each half cycle so that good mixing occurs. For example, referring to FIG. 4, by shifting reversing switch 47 at a rate of about 3 cycles per minute and with a current of about 1 ampere, a well developed color pattern can be restored to a substantially uniform neutral color characteristic of the starting electrolyte in about 5 to 10 minutes. A varying rate of alternation is even more effective. Thus, starting with a reversing rate of about 1 cycle per minute and gradually increasing the frequency to 60 cycles per minute gave best results.

Figure 14:
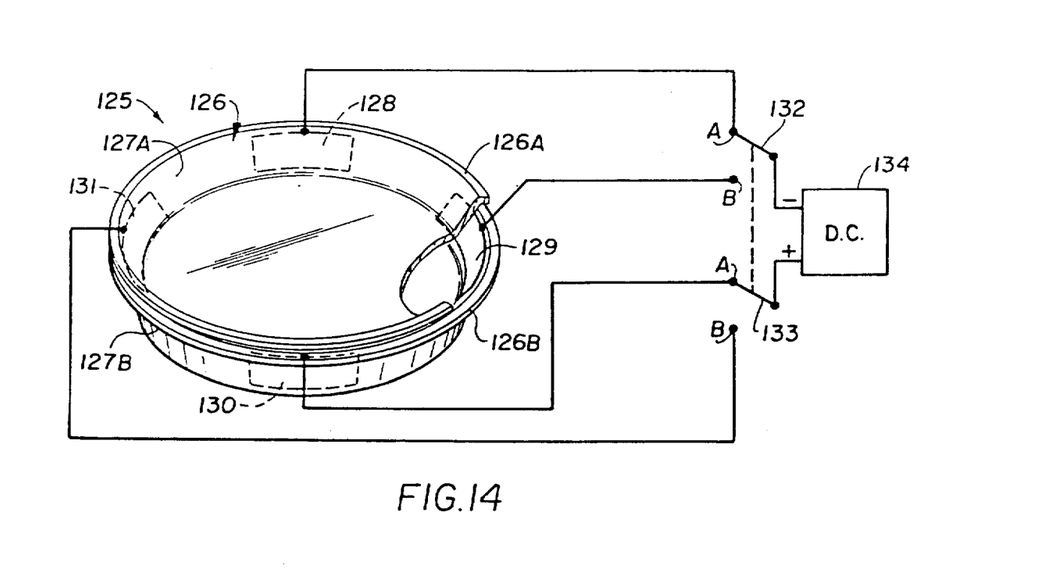
FIG. 14 is a diagrammatic plan view of an electrokinetic display device in accordance with the present invention having a plurality of sets of electrodes.

When desired, more than one set of electrodes can be used to selectively control the direction of current flow in the electrokinetic device of the present invention as will now be described in connection with FIG. 14 which is partially cut away for convenience. Electrokinetic device 125, like device 100, is conveniently shown as comprising a dish-shaped container 126, in this instance made up of two nesting circular dished members 126A, 126B, made of glass and having annular side walls 127A and 127B. A plurality of electrodes are mounted in the container 126 between members 126A, 126B and adjacent to their peripheries. As shown, device 125 has four electrodes 128, 129, 130 and 131 arranged for connection in sets through two ganged switches 132, 133 across the D.C. power supply 134. The connections between the electrodes 128–131 and the contacts A and B of each of the switches 132 and 133 are arranged so that electrodes 128 and 130 form one set and are connected across the power supply 134 with the ganged poles of the switches in the position shown. Electrodes 129 and 131 are shown as connected to a corresponding pair of open contacts B of the switches 132, 133. When the poles of switches 132 and 133 are shifted, the connections to contacts 132A and 133A are broken and the connections to contacts 132B and 133B are made. Manifestly more than two sets of electrodes and contacts can be provided when desired.

It is to be understood that electrokinetic device 125 can also include motive means such as described in detail in connection with FIGS. 1–6 hereinabove. For example, motive means 33 including a disc 37 carrying magnet means 34 can be mounted for rotation beneath the container 126. Further details of the construction and operation of motive means 33 will be clearly apparent from the description thereof in connection with FIGS. 1–6. The operation of electrokinetic device 125 when filled with the desired electrolyte and connected as shown in FIG. 14 is clearly evident; the current path through the electrolyte extending generally vertically (as viewed) between electrodes 128 and 130. The current path can be switched at will by manually shifting switches 132 and 133 to provide a generally horizontally extending (as viewed in FIG. 14) current path between electrodes 127 and 129. The direction of current flow will be as indicated by the polarity of the switch poles but, as before, can also be changed at will by introducing a reversing switch when desired. Switches 132, 133 can be manually operable as shown, relay operated or they can be programmed as described in connection with FIGS. 4–6. If desired more than two electrodes can be used simultaneously. For example, by providing a pair of normally open switches, one across the A and B contacts of each of the switches 132, 133 and which when closed serve to connect electrodes 128, 129 and electrodes 130, 131 respectively to the negative and positive terminals of D.C. source 134 independent of the position of the switches 132, 133.

From the foregoing it is apparent that the present invention is susceptible to wide variation and it is intended to include all such variations within the scope and spirit of the invention as set forth in the claims. The magnetic field strength of the magnetic means can vary widely to achieve different results, those used in connection with the embodiments of FIGS. 1–6 gave good results and developed a field of about 500 gauss in the electrolyte opposite the center of the magnet faces. The starting pH of the electrolyte used can also be varied as desired to take advantage of desired color changes. Thus, the starting pH can be selected so as to permit the use of different indicators some of which give desired color changes at higher alkalinity while others are preferably used at higher starting acidity. Other useful indicators that can be used include: (a) methyl red plus bromcresol green which at low pH gives red/orange, at high pH green and at mid pH pale green; (b) methyl red plus thymolphthalein which gives red at low pH, purple/brown at high pH and yellow at mid pH; (c) thymolphthalein which is colorless at both low and mid pH levels and blue at high pH; (d) thymolphthalein plus phenolphthalein which is colorless at low pH; purple at high pH and red at about a pH of 10 (the mid pH for this indicator); (e) "pHydrion" red/orange for low pH; yellow for mid pH; green at high pH and deep violet for very high pH; and (f) thymol blue which is orange at low pH, blue at high pH and yellow at about mid pH. In each instance, by the mid pH value as used here is meant the pH of the starting electrolyte.

In some instances it may be desirable to have the chemical concentration gradients indicated by or the indication thereof enhanced by the formation of a precipitate in certain regions. For example, in the case of a solution containing aluminum ions, as the pH is increased from low or acid pH to about 8, aluminum hydroxide precipitate forms, which redissolves at substantially higher pH. Zinc ions can also be used in that way to provide a precipitate. Such precipitates serve to provide the appearance of clouds in a display device.

The useful life of certain indicators or dyes in the electrokinetic device of the present invention can be extended substantially by minimizing migration of the dye into the regions of the electrodes where the dye may be adversely affected such as by oxidation or reduction. While phenolphthalein is not significantly affected, methyl red and bromcresol green were noticeably affected after prolonged operation. Because the adverse reactions take place close to the electrodes, membranes which are substantially impervious to the relatively large molecules of the dye or dyes present but porous to the species which must reach the electrodes serve to exclude the dyes from the area of the cell adjacent the electrodes. For this purpose, cellophane diffusion tubing, anionic exchanger film made from polyethylene-vinyl pyridine copolymer and cationic exchanger film made from cross-linked polyethylene-methylacrylic acid copolymer significantly reduced the rate at which dye was lost. The use of cellophane barriers reduced the rate at which bromcresol green was lost by about 50%. One way in which such an arrangement is constructed is as was described in connection with FIG. 7, enclosures 79 being made of cellophane with the wall sealed at its bottom and pleated to enlarge the surface area thereof.

When desired, visual effects can be provided in conjunction with sound effects. In that event, the full wave rectified output of one or more output transformers of an audio amplifier is used as the D.C. source for the electrodes of the electrokinetic cell. At relatively low current density through the cell, the cell display tends to follow sustained changes in output level from the audio amplifier. With high current density between the cell electrodes or with very strong magnetic means, the visual effects in the cell more closely follow the changes in amplitude of the audio output. Best results would be provided by using both high current density and large magnetic force. In such an arrangement the visual effects can be enhanced by utilizing one or more chemical gradient indicators in the electrolyte which fluoresce under ultra violet illumination and in including U.V. in the source of light or alone to illuminate the device. It is also contemplated that fluorescent indicators be used together with U.V. illumination in the devices constructed in accordance with the present invention, as for example those described hereinabove, without coupling the electrolyte cell to an audio amplifier.

While the preferred embodiment of this invention has been described utilizing magnetic motive means, it is also contemplated that other motive means can be used as desired either alone or in combination including in combinaion with magnetic means. Thus, to induce additional effects, particularly in larger units constructed in accordance with the embodiments shown and described herein, a pump can be used to cause movements of the electrolyte. The injection of a gas such as air in the region of one or more of the electrodes particularly when done intermittently can be used to provide sudden or more rapid changes in the patterns displayed. It is also contemplated that the motive means can comprise convection-inducing means such as an electric resistance heating element immersed in the electrolyte or mounted on or adjacent to the back of the electrokinetic device. In the latter instance an illuminating lamp used to transilluminate the display can also serve as a source of heat to induce convection in the electrolyte.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A method for displaying chemical concentrations and gradients associated therewith, comprising forming in an electrochemical cell a starting electrolyte which contains at least one reagent which during electrolysis forms reaction product species that react chemically substantially reversibly, said electrochemical cell having at least two spaced electrodes extending in and defining a current path in said electrolyte and having a wall at least part of which is transparent and a second wall extending in spaced relation along opposite sides of said current path, the distance between said walls across said path being no greater than about three inches and between said electrodes being such that the ratio of the interelectrode distance to the interwall distance is at least about 5 to 1, said electrolyte during electrolysis containing electrolysis reaction-product species movable along said path in the space between the cell electrodes, said reagent being selected from the group consisting of (a) self-indicating reagents the reaction products of which provide one or more indications of the chemical concentration thereof, (b) reagents which include an indicator reagent that provides one or more indications of the presence of electrolysis reaction products, and (c) mixtures of (a) and (b), and passing at least enough current in one direction between the cell electrodes to establish at least one flow of electrolysis reaction-products in said electrolyte along said path between said electrodes visible through the transparent wall and accompanied by a chemical concentration gradient.

2. The method set forth in claim 1 which includes controlling gas evolved at the electrodes so as to control mixing of the electrolyte thereby.

3. The method set forth in claim 1 in which said reversible method is accompanied by a reversible change in pH.

4. The method set forth in claim 3 in which said reagents include a pH indicator.

5. The method set forth in claim 1 in which said ratio is at least about 10 to 1.

6. The method set forth in claims 1 2, 3, 4 or 5 which includes changing the acceleration of the electrolysis reaction products in the electrolyte.

7. The method set forth in claims 1, 2, 3, 4 or 5 in which a magnetic field is applied substantially transverse to the current in said cell to change the acceleration of electrolysis reaction products in the electrolyte.

8. The method set forth in claim 7 which includes moving said magnetic field relative to the electrolyte while maintaining it substantially transverse to the cell current.

9. The method set forth in claim 8 in which the direction of the current between the cell electrodes is reversed long enough to reverse said induced acceleration of said electrolysis reaction products.

10. The method set forth in claim 8 which includes interrupting the current between the electrodes long enough to affect the flows in the electrolyte.

11. The method set forth in claim 9 which includes interrupting the current between the electrodes long enough to affect the flows in the electrolyte.

12. The method set forth in claim 6 in which a gas is introduced into the electrolyte to accelerate flows therein.

13. The method set forth in claim 6 which includes pumping the electrolyte to accelerate flows therein.

14. The method set forth in claim 6 which includes heating the electrolyte to induce convection therein.

15. The method set forth in claim 1, 2, 3, 4 or 5 in which alternating current is then passed between the cell electrodes.

16. The method set forth in claim 15 in which the current reversing rate is varied from about 1 cycle per minute to about 60 cycles per minute.

17. The method set forth in claim 1 in which said indicator is substantially excluded from the region of said cell adjacent to the cell electrodes.

18. The method set forth in claim 1, 2, 3, 4 or 5 in which the current is thereafter interrupted long enough for said flow to form a substantially stationary pattern.

19. The method set forth in claim 18 in which said electrodes are arranged to predetermined relation to form a plurality of substantially stationary patterns corresponding to which electrodes are energized by passing current therebetween, and energizing selected electrodes to form a predetermined subtantially stationary pattern.

20. An electrokinetic display apparatus for displaying chemical concentrations and gradients associated therewith, comprising means forming an electrochemical cell adapted for containing a starting electrolyte made up of at least one reagent which during electrolysis forms reaction product species that react chemically substantially reversibly, said cell having front and back wall members extending in spaced relation with at least part of said front wall member being substantially transparent and forming a viewing plane, said cell having at least two electrodes in predetermined spaced relation to each other and defining a current path in said electrolyte along which said viewing plane extends, the distance between said front and back wall members in the direction normal to said viewing plane and across said current path being no greater than about 3 inches and the ratio of the interelectrode distance to the interwall distance being at least about 5 to 1, said reagent being selected from the group consisting of (a) self-indicating reagents the reaction products of which provide one or more indications of the chemical concentration thereof, (b) reagents which include an indicator reagent that provides one or more indications of the presence of electrolysis reaction products, and (c) mixtures of (a) and (b), and means for passing at least enough current in one direction between the cell electrodes to establish at least one visible flow of electrolysis reaction-products in said electrolyte along said path accompanied by a chemical concentration gradient, said visible flow being visible at said viewing plane.

21. The apparatus set forth in claim 20 which comprises means for controlling gas evolved at the cell electrodes.

22. The apparatus set forth in claim 20 which comprises means for accelerating the electrolysis reaction products.

23. The apparatus set forth in claim 21 which comprises means for accelerating the electrolysis reaction products.

24. The apparatus set forth in claim 20 which comprises means for reversing the direction of the current between the cell electrodes.

25. The apparatus set forth in claim 21 which comprises means for reversing the direction of the current between the cell electrodes.

26. The apparatus set forth in claim 20 in which said ratio of the interelectrode distance to the interwall distance is at least about 10 to 1.

27. The apparatus set forth in claim 20, 21, 24, 25 or 26 which includes magnetic means for inducing a magnetic field in said cell transverse to said current.

28. The apparatus set forth in claim 27 in which said magnetic means includes a permanent magnet.

29. The apparatus set forth in claim 28 which includes means for moving said magnet substantially parallel to said viewing plane.

30. The apparatus set forth in claim 29 which includes means for varying the rate at which said magnet is moved.

31. The apparatus set forth in claim 20 or 26 which comprises means for automatically reversing the direction of the current between the cell electrodes in accordance with a predetermined program.

32. The apparatus set forth in claim 31 which includes means for generating a magnetic field transverse to said current and movable along a path substantially parallel to said viewing plane, and means for moving said magnetic field.

33. The apparatus set forth in claim 32 which includes means for varying the rate at which said magnetic field is moved.

34. The apparatus set forth in claim 20, 21, 25 or 26 which includes electromagnetic means for inducing a magnetic field in said cell transverse to said current.

35. The apparatus set forth in claim 34 which includes means for moving said electromagnetic means along a path substantially parallel to said viewing plane.

36. The apparatus set forth in claims 20, 21, 25 or 26 which includes magnetic means and means movably supporting said magnetic means for movement close to said back wall member for inducing a movable magnetic field in said cell transverse to said current, and motive means for moving said magnetic means.

37. The apparatus set forth in claim 36 in which at least part of said back member is transparent, and illuminating means for transilluminating through said back wall member said space between said wall members.

38. The apparatus set forth in claim 21 in which said front and back wall members extend in spaced substantially parallel relation, said gas controlling means including a tubular member enclosing each of said electrodes, each of said tubular members being porous to said electrolyte and nonporous to gas bubbles evolved at said electrodes.

39. The apparatus set forth in claim 38 which comprises support means movably positioned adjacent to the outer surface of said back wall member, magnetic means on said support means for inducing a magnetic field in said cell transverse to said current, and motive means connected to said support means for actuating the same to move said magnetic means and the magnetic field associated therewith along a path substantially parallel to said wall members.

40. The apparatus set forth in claim 39 which includes means for adjusting the rate at which said motive means actuates said support means.

41. The apparatus set forth in claim 40 which includes means for reversing the direction of the current between said electrodes.

42. The apparatus set forth in claim 41 which includes means for varying the amount of said current.

43. The apparatus set forth in claim 40 which includes preprogrammed means for automatically reversing the direction and varying the quantity of current between said electrodes according to a predetermined program.

44. The apparatus set forth in claim 43 in which said preprogrammed means includes switch means, a shaft, means for rotating said shaft, cam means rotatably mounted on said shaft and positioned to actuate said switch means.

45. The apparatus set forth in claim 21 in which said wall members extend in spaced substantially horizontal relation, said gas controlling means comprising vertically extending portions of said cell adjacent to the ends of said wall members, said vertically extending portions extending above said wall members and communicating with the space therebetween, and said electrodes extending horizontally in said vertically extending portions of said cell above the space between said wall members.

46. The apparatus set forth in claim 45 which comprises a plurality of pairs of electrodes, and means for passing current between selected electrodes.

47. The apparatus set forth in claim 46 which comprises magnetic means and means movably supporting the same adjacent to the outer surface of one of said wall members, and means for moving said magnetic means along a substantially horizontal path.

48. The apparatus set forth in claim 20 which comprises a plurality of indicia electrodes and at least one counter electrode, and means for passing current between (a) selected ones of said indicia electrodes and (b) said counter electrode for displaying a predetermined pattern.

49. The apparatus set forth in claim 48 in which said predetermined pattern is substantially stationary.

50. A method for displaying chemical concentrations and gradients associated therewith, comprising forming in an electrochemical cell a starting electrolyte which contains at least one reagent which during electrolysis forms reaction product species that react substantially reversibly, said electrochemical cell having at least two spaced electrodes extending in and defining a current path in said electrolyte and having a transparent wall and a second wall extending in close spaced relation along opposite sides of said current path, the distance between said walls across said path being small compared to the distance between said electrodes, said electrolyte during electrolysis containing electrolysis reaction-product species movable along said path in the space between the cell electrodes, said reagent being selected from the group consisting of (a) self-indicating reagents the reaction products of which provide one or more indications of the chemical concentration thereof, (b) reagents which include an indicator reagent that provides one or more indications of the presence of electrolysis reaction products, and (c) mixtures of (a) and (b), passing at least enough current in one direction between the cell electrodes to establish at least one flow of electrolysis reaction-products in said electrolyte along said path between said electrodes visible through said transparent wall and accompanied by a chemical concentration gradient, and magnetically inducing a change in the acceleration of electrolysis reaction products in the electrolyte.

51. The method set forth in claim 50 which includes controlling gas evolved at the electrodes so as to control mixing of the electrolyte thereby.

52. The method set forth in claim 50 in which said electrolyte contains a buffering agent.

53. The method set forth in claim 50 in which said reversible reaction is a redox reaction.

54. The method set forth in claim 53 in which said reagents include a redox indicator.

55. The method set forth in claim 50 in which said reversible reaction is accompanied by a reversible change in pH.

56. The method set forth in claim 55 in which said reagents include a pH indicator.

57. The method set forth in claims 50, 51, 52, 53, 54, 55 or 56 in which a magnetic field is applied substantially transverse to the current in said cell to change the acceleration of electrolysis reaction products in the electrolyte.

58. The method set forth in claim 57 which includes moving said magnetic field relative to the electrolyte while maintaining it substantially transverse to the cell current.

59. The method set forth in claim 58 in which the direction of the current between the cell electrodes is reversed long enough to reverse said induced acceleration of said electrolysis reaction products.

60. The method set forth in claim 58 which includes interrupting the current between the electrodes long enough to affect the flows in the electrolyte.

61. The method set forth in claim 59 which includes interrupting the current between the electrodes long enough to affect the flows in the electrolyte.

62. The method set forth in claim 50 in which a gas is introduced into the electrolyte to accelerate flows therein.

63. The method set forth in claim 50 which includes pumping the electrolyte to accelerate flows therein.

64. The method set forth in claim 50 which includes heating the electolyte to induce convection therein.

65. The method set forth in claim 50, 51, 52, 53, 54, 55 or 56 in which alternating current is then passed between the cell electrodes.

66. The method set forth in claim 65 in which the current is alternated at a frequency ranging from about 1 to 60 cycles per minute.

67. The method set forth in claim 65 in which the current reversing rate is varied from about 1 cycle per minute to about 60 cycles per minute.

68. The method set forth in claim 54 or 56 in which said indicator is substantially excluded from the region of said cell adjacent to the cell electrodes.

69. The method set forth in claim 50, 51, 52, 53, 54, 55 or 56 in which the current is thereafter interrupted long enough for said flow to form a substantially stationary pattern.

70. The method set forth in claim 69 in which said electrodes are arranged in predetermined relation to form a plurality of substantially stationary patterns corresponding to which electrodes are energized by passing current therebetween, and energizing selected electrodes to form a predetermined substantially stationary pattern.

* * * * *